United States Patent
Spicer

(10) Patent No.: US 8,523,152 B2
(45) Date of Patent: Sep. 3, 2013

(54) REMOVABLE FLUID DOWNCOMER WITH SEAL POT PAN FOR VOLATILE ORGANIC COMPOUND REMOVAL DEVICE

(75) Inventor: Bryan D. Spicer, Monroe, MI (US)

(73) Assignee: QED Environmental Systems, Inc., Ann Arbor, MI (US)

( * ) Notice: Subject to any disclaimer, the term of this patent is extended or adjusted under 35 U.S.C. 154(b) by 489 days.

(21) Appl. No.: 12/958,538

(22) Filed: Dec. 2, 2010

(65) Prior Publication Data

US 2012/0139135 A1 Jun. 7, 2012

(51) Int. Cl.
 *B01F 3/04* (2006.01)
(52) U.S. Cl.
 USPC ........................................ 261/113; 261/114.5
(58) Field of Classification Search
 USPC .................... 261/113, 114.1, 114.3, 114.5
 See application file for complete search history.

(56) References Cited

U.S. PATENT DOCUMENTS

| | | | |
|---|---|---|---|
| 2,575,186 A * | 11/1951 | Ryant, Jr. .................. | 261/114.1 |
| 2,791,408 A | 5/1957 | Lewis | |
| 2,939,771 A | 6/1960 | McDonald et al. | |
| 3,824,081 A * | 7/1974 | Smith et al. .................. | 422/217 |
| 3,958,952 A * | 5/1976 | van Ginneken ............... | 422/616 |
| 4,174,363 A | 11/1979 | Bruckert | |
| 4,305,895 A * | 12/1981 | Heath et al. ................. | 261/114.2 |
| 5,240,595 A | 8/1993 | Lamarre | |
| 5,318,732 A * | 6/1994 | Monkelbaan et al. ..... | 261/114.1 |
| 5,378,267 A | 1/1995 | Bros et al. | |
| 5,478,507 A | 12/1995 | Bros | |
| 5,518,668 A | 5/1996 | Chresand et al. | |
| 7,552,915 B2 * | 6/2009 | Hieringer et al. .......... | 261/114.1 |

* cited by examiner

*Primary Examiner* — Charles Bushey
(74) *Attorney, Agent, or Firm* — Harness, Dickey & Pierce, P.L.C.

(57) ABSTRACT

A volatile organic compound removal device includes a cabinet having first and second slidable drawers movable between inserted and extended positions. A downcomer tube is downwardly and slidably received in an aperture of the first drawer. A sealing flange extends horizontally outward from a downcomer tube perimeter and extends beyond the aperture when the downcomer tube is received in the aperture. The sealing flange faces an upward facing surface of the first drawer and supports the downcomer tube to the first drawer using only a weight of the downcomer tube applied through the sealing flange to the upward facing surface. A removable seal pot pan is supported on an upward facing surface of the second drawer, which is aligned directly below and receives a lower end of the downcomer tube.

20 Claims, 6 Drawing Sheets

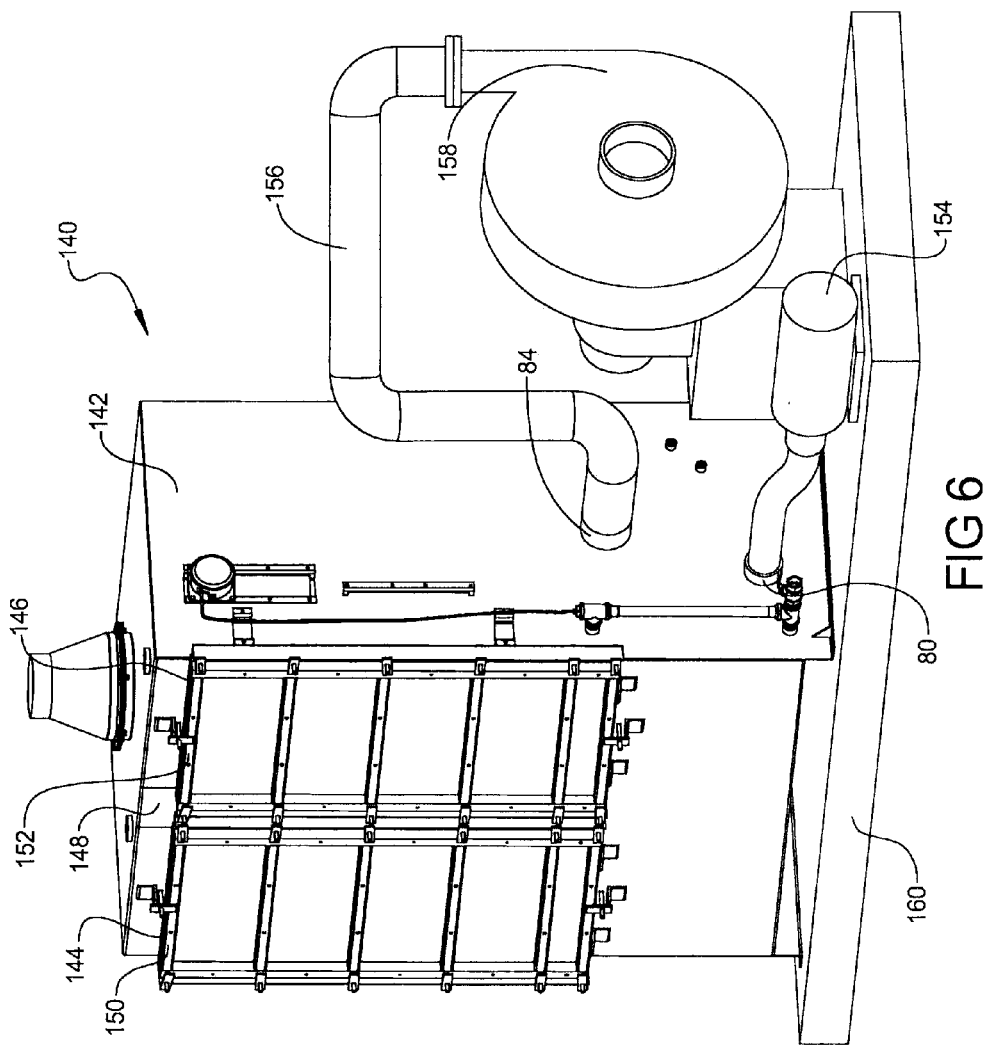

REMOVABLE FLUID DOWNCOMER WITH SEAL POT PAN FOR VOLATILE ORGANIC COMPOUND REMOVAL DEVICE

FIELD

The present disclosure relates to downcomer and seal pot pan assemblies used in devices for removal of organic compounds from water by air stripping.

BACKGROUND

This section provides background information related to the present disclosure which is not necessarily prior art.

Groundwater and waste streams can be contaminated with volatile organic compounds (VOCs) which require removal in order to reuse or discharge the water. Air strippers which direct streams of air into a flowing stream of the contaminated water are used to transfer the VOCs from the water (aqueous phase) to the air stream (gaseous phase) which permits removal of the VOCs. Known air strippers include tower designs and stacked designs.

The phase change from the aqueous to the gaseous phase commonly results in mineral deposits, biologic fouling, and other precipitant deposits occurring at the water/air interface. Cleaning known air stripper designs is cumbersome and time consuming due to the necessary disassembly required and the size/weight of the components that must be removed to access the fouled components.

SUMMARY

This section provides a general summary of the disclosure, and is not a comprehensive disclosure of its full scope or all of its features.

According to several embodiments, a volatile organic compound removal device includes a cabinet sealed when a fluid is flowing in the cabinet. The cabinet has at least one drawer. A downcomer tube is downwardly and slidably received in an aperture of the drawer. A sealing flange extends horizontally outward from a downcomer tube perimeter and extends beyond the aperture when the downcomer tube is received in the aperture. The sealing flange faces an upward facing surface of the drawer and supports the downcomer tube from the drawer using only a weight of the downcomer tube applied through the sealing flange to the upward facing surface.

According to additional embodiments, a volatile organic compound removal device includes a cabinet having first and second slidable drawers movable between inserted and extended positions. A downcomer tube is downwardly and slidably received in an aperture of the first drawer. A sealing flange extends horizontally outward from a downcomer tube perimeter and extends beyond the aperture when the downcomer tube is received in the aperture. The sealing flange faces an upward facing surface of the first drawer and supports the downcomer tube to the first drawer using only a weight of the downcomer tube applied through the sealing flange to the upward facing surface. A removable seal pot pan supported on an upward facing surface of the second drawer is aligned directly below and receives a lower end of the downcomer tube. The seal pot pan is movable upward when empty to contact a lower edge of the downcomer tube preventing airflow in an upward direction through the downcomer tube.

According to further embodiments, a volatile organic compound removal device includes a cabinet having multiple drawers each slidably received in the cabinet and each individually movable between an inserted and an extended position. Individual downcomer tubes are each slidably received in an aperture in one of the drawers. A sealing flange extends horizontally outward from a perimeter of each of the downcomer tubes and extends beyond the aperture when the downcomer tubes are received in the aperture of the one of the drawers. The sealing flange faces an upward facing surface of the one of the drawers and supports the downcomer tube using only a weight of the downcomer tube applied through the sealing flange to the upward facing surface. Multiple removable seal pot pans are individually supported on an upward facing surface of individual ones of the multiple drawers having a lower end of the downcomer tube from an upper one of the multiple drawers aligned with and received in the seal pot pan supported on a successive lower one of the drawers. Each of the multiple seal pot pans is freely movable upward when empty to contact a lower edge of the downcomer tube preventing airflow in an upward direction through the downcomer tube, and each is movable downward from a weight of a liquid received from the downcomer tube to contact the upward facing surface of the individual ones of the multiple drawers.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a left front perspective view of another embodiment of a volatile organic compound removal device of the present disclosure.

Corresponding reference numerals indicate corresponding parts throughout the several views of the drawings.

DETAILED DESCRIPTION

Figure 1:
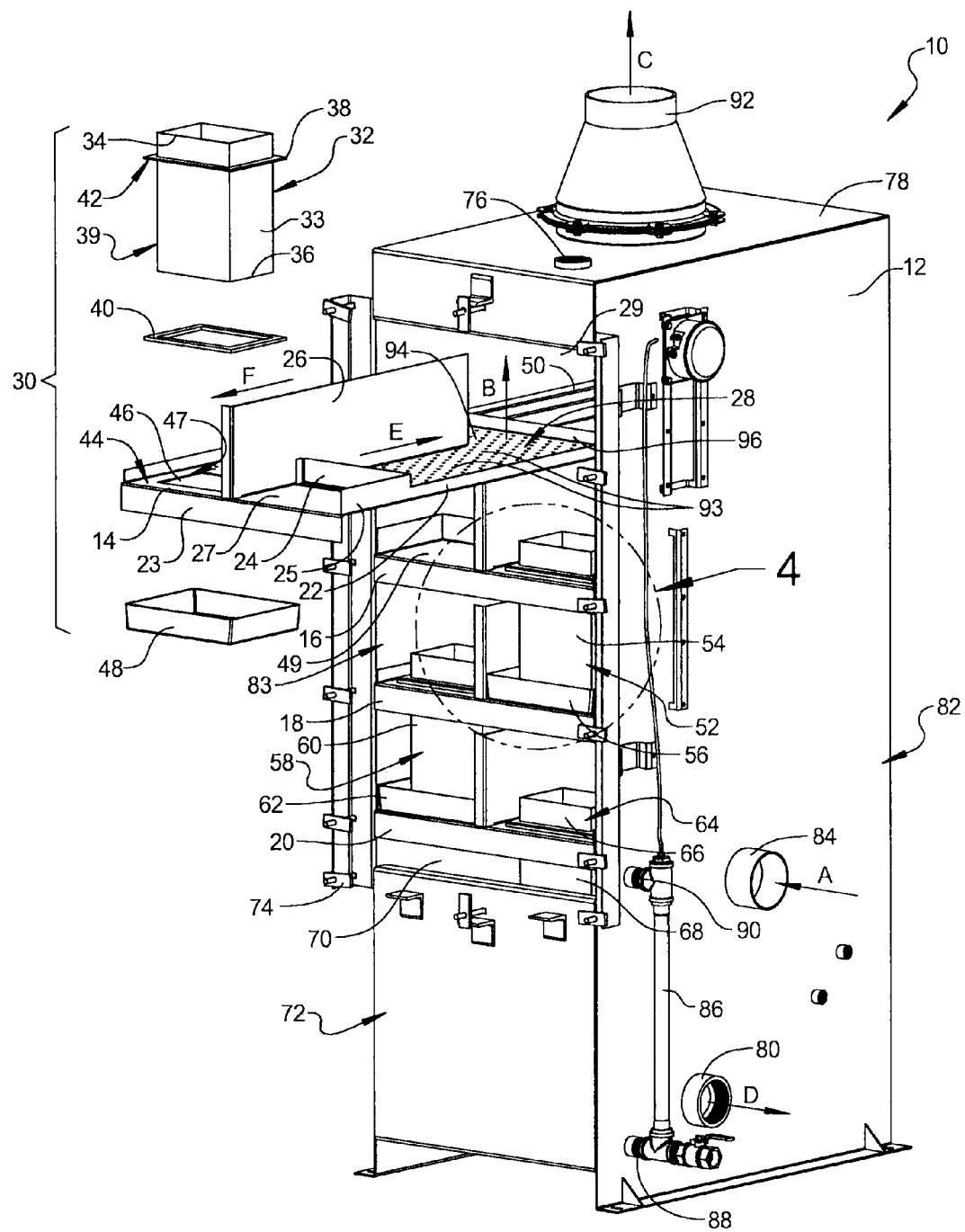
FIG. 1 is a front left perspective view of a volatile organic compound removal device having a downcomer and seal pot pan of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a volatile organic compound (VOC) removal device 10, which can be operated to remove VOCs and similar materials from a stream of water, includes a cabinet 12 having a first sliding drawer 14 that slides into and out of cabinet 12. Also included with cabinet 12 are second, third, and fourth sliding drawers 16, 18, 20, which create flow paths and operate the same as first sliding drawer 14. First, second, third, and fourth sliding drawers 14, 16, 18, 20 are slidable into and out of cabinet 12 to permit removal for cleaning of the various components provided with each of the sliding drawers. Each of the first, second, third, and fourth sliding drawers 14, 16, 18, 20 are similar to each other in the components provided, but are sequentially organized in mirror image arrangements such that each successive drawer arranged in cabinet 12 from a top to the bottom has an opposite (right/left) configuration compared to the drawer immediately above it.

Each of the first, second, third, and fourth sliding drawers 14, 16, 18, 20 include a drawer perimeter wall 22 made of a light gauge metal, such as aluminum, a downwardly directed front drawer wall 23, and a first dividing wall 24 oriented substantially parallel to front drawer wall 23 and having a height greater than a height of drawer perimeter wall 22. A perimeter wall portion 25 of drawer perimeter wall 22 has a height equal to the height of first dividing wall 24. A second dividing wall 26 bisects each of the sliding drawers and has a second dividing wall height greater than the height of the first dividing wall 24. Each of the drawers also includes a solid drawer portion 27 bounded by first dividing wall 24, perimeter wall portion 25, and a portion of second dividing wall 26. A perforated drawer portion 28 is divided by second dividing wall 26. A height of second dividing wall 26 substantially fills a drawer space envelope 29.

Each of the sliding drawers further includes a downcomer/seal pot pan assembly, which is removable when the drawer is in its outward extended position illustrated by first sliding drawer 14 shown in FIG. 1. A downcomer/seal pot pan assembly 30 represents the configuration used for each of first, second, and third sliding drawers 14, 16, 18. Downcomer/seal pot pan assembly 30 includes a first downcomer tube assembly 32, which includes a first downcomer tube 33 having an upper downcomer tube end 34 separated from a lower downcomer tube end 36 by a sealing flange 38 extending perpendicularly outward and away from an outer perimeter surface 39 of first downcomer tube 33. According to several embodiments, first downcomer tube 33 is rectangular in shape and can be formed from a thin gauge metal material, such as aluminum. Sealing flange 38 extends about the entire perimeter surface 39 of first downcomer tube 33. Sealing flange 38 is sized to fully engage a downcomer gasket 40, which is shaped similar to sealing flange 38. Downcomer gasket 40 can be made of a rubber-like resilient material and contacts a downward facing flange surface 42 on a first side of sealing flange 38 and oppositely contacts an upward facing downcomer support drawer surface 44 on an opposite second side of downcomer gasket 40 when first downcomer tube 33 is downwardly slid through a downcomer receiving aperture 46. Sealing flange 38 and downcomer gasket 40 are larger than and therefore extend beyond a perimeter edge 47 of downcomer receiving aperture 46.

Sealing flange 38 provides the entire support and connection between first downcomer tube assembly 32 and first sliding drawer 14. No additional fasteners, clamps, or mechanical attachment devices are used to retain first downcomer tube assembly 32 in its contact position with downcomer support drawer surface 44. A downward directed force from the weight of first downcomer tube 33 acting through sealing flange 38 maintains contact between sealing flange 38, downcomer gasket 40, and downcomer support drawer surface 44.

After first downcomer tube assembly 32 is slidably received in downcomer receiving aperture 46 and first sliding drawer 14 is slidably inserted into cabinet 12, the lower downcomer tube end 36 of first downcomer tube 33 is positioned within a first seal pot pan 48, which rests on a solid drawer portion 49 of second sliding drawer 16. Fluid which is received in first downcomer tube 33 falls by gravity and is received in first seal pot pan 48. Although the seal pot pans are a portion of the downcomer/seal pot pan assemblies of the present disclosure, the seal pot pans are supported by a next lower successive sliding drawer compared to the downcomer tube assemblies.

Each of the sliding drawers (including first, second, third, and fourth sliding drawers 14, 16, 18, 20) are slidably supported within cabinet 12 in a similar manner. To accomplish this, a plurality of drawer support members 50 are fixed to opposite sidewalls of cabinet 12 and are configured to permit only sliding motion of the sliding drawers. Drawer support members 50 help prevent upward or downward motion of the sliding drawers when the sliding drawers are in the fully inserted position within cabinet 12.

As previously noted, each of the sliding drawers of cabinet 12 include similar components to first sliding drawer 14; however, each successive sliding drawer is configured in a mirror image arrangement with respect to the sliding drawer immediately above it. For example, a second downcomer tube assembly 52 is supported by second sliding drawer 16 having second downcomer tube assembly 52 located on a right hand side of cabinet 12, compared to the left hand side position of first downcomer tube assembly 32. A second downcomer tube 54 of second downcomer tube assembly 52 is substantially identical to first downcomer tube 33, including use of sealing flange 38 and downcomer gasket 40. A second seal pot pan 56, substantially identical to first seal pot pan 48, receives the lower end of second downcomer tube 54 when second seal pot pan 56 is supported on third sliding drawer 18.

A third downcomer tube assembly 58 is substantially identical to each of first and second downcomer tube assemblies 32, 52 and includes a third downcomer tube 60 axially aligned beneath first downcomer tube 33. A third seal pot pan 62 receives a lower end of third downcomer tube 60 and is positioned on fourth sliding drawer 20.

A fourth downcomer tube assembly 64 is supported from fourth sliding drawer 20 in the same manner that first, second, and third downcomer tube assemblies 32, 52, 58 are supported by their successive sliding drawers. A fourth downcomer tube 66 of fourth downcomer tube assembly 64 is modified to increase its axial length compared to the other downcomer tubes such that a lower downcomer tube end 68 of fourth downcomer tube 66 is suspended within a sump or chamber 70 located at a lower end of cabinet 12. Chamber 70 defines a lower fluid containment portion 72, which receives and temporarily contains water after cleaning to remove the VOCs and prior to being pumped out of cabinet 12. When each of the first, second, third, and fourth sliding drawers 14, 16, 18, 20 are fully inserted into cabinet 12, a door (not shown in this view) covers the cabinet opening used for each of the sliding drawers and is seated against cabinet 12 using a plurality of engagement members 74.

Water contaminated with VOCs is initially received through a contaminated fluid receiving port 76 which penetrates a cabinet upper wall 78 of cabinet 12. After removal of the VOCs from the water received through contaminated fluid receiving port 76, clean water is discharged from chamber 70 of cabinet 12 via a clean water discharge port 80 which penetrates chamber 70 through a cabinet first side wall 82. A fresh air inlet port 84 also penetrates cabinet first side wall 82 to deliver a flow of fresh air into cabinet 12 which is used to separate the VOCs from the water. Visual indication of a level of the clean water within lower fluid containment portion 72 is provided by a fluid level indication standpipe 86 connected between a lower standpipe port 88 and an upper standpipe port 90 which penetrate the cabinet first side wall 82. Fluid level indication standpipe 86 is made from a transparent or semi-transparent material such as glass or plastic. A fluid level within fluid level indication standpipe 86 is shown and better described in reference to FIG. 2. After the VOCs have been removed from the contaminated water entering cabinet 12, a combination of the VOCs in the gaseous state and the air received through fresh air inlet port 84 are together discharged through an air/VOC discharge port 92 which also penetrates cabinet upper wall 78.

Each perforated drawer portion 28 of the first, second, third, and fourth sliding drawers 14, 16, 18, 20 includes a plurality of apertures 93 which direct airflow in an upward direction and opposite to the overall downward direction of the water flowing through cabinet 12. Air flowing upwardly through the apertures 93 causes a frothing action of the water, which separates the water and VOCs, permitting the VOCs to be entrained with the air and discharged through air/VOC discharge port 92.

An exemplary flow path for the water contaminated with VOCs with respect to first sliding drawer 14 is as follows. The water contaminated with VOCs is initially received through contaminated fluid receiving port 76 in a downward direction and impacts solid drawer portion 27 of first sliding drawer 14. The entire volume of water overflows the first dividing wall 24 and is forced between second dividing wall 26 and cabinet first side wall 82 to flow over perforated drawer portion 28. Air entering fresh air inlet port 84 in an inlet flow direction "A" turns generally upward in an air/VOC flow direction "B" through the plurality of multiple apertures 93 separates a portion of the VOCs from the water as the contaminated water flows horizontally over perforated drawer portion 28. The air flowing in air/VOC flow direction "B" continues in its upward trajectory until it is collected and removed via air/VOC discharge port 92 in an air/VOC discharge direction "C". Clean water, which is received in lower fluid containment portion 72, is discharged in a clean water discharge direction "D" via clean water discharge port 80.

After the contaminated water with entrained VOCs travels in a first flow direction "E" between second dividing wall 26 and cabinet first side wall 82, it is re-routed at a flow transition portion 94 located between an end of second dividing wall 26 and a rear perimeter wall portion 96 of drawer perimeter wall 22 to be returned in an opposite second flow direction "F" on an opposite side of second dividing wall 26 where the flow is contained between second dividing wall 26 and cabinet second side wall 83. This flow of water overflows the upper downcomer tube end 34 of first downcomer tube 33 and falls downwardly through first downcomer tube 33 to be received in first seal pot pan 48. After overflowing first seal pot pan 48, the contaminated water, now having a reduced volume of VOCs, travels in a similar but oppositely directed flow path on second sliding drawer 16. These alternating flow patterns are repeated at each of the sliding drawers until a remaining clean water volume is directed through lower downcomer tube end 68 into lower fluid containment portion 72.

Figure 2:
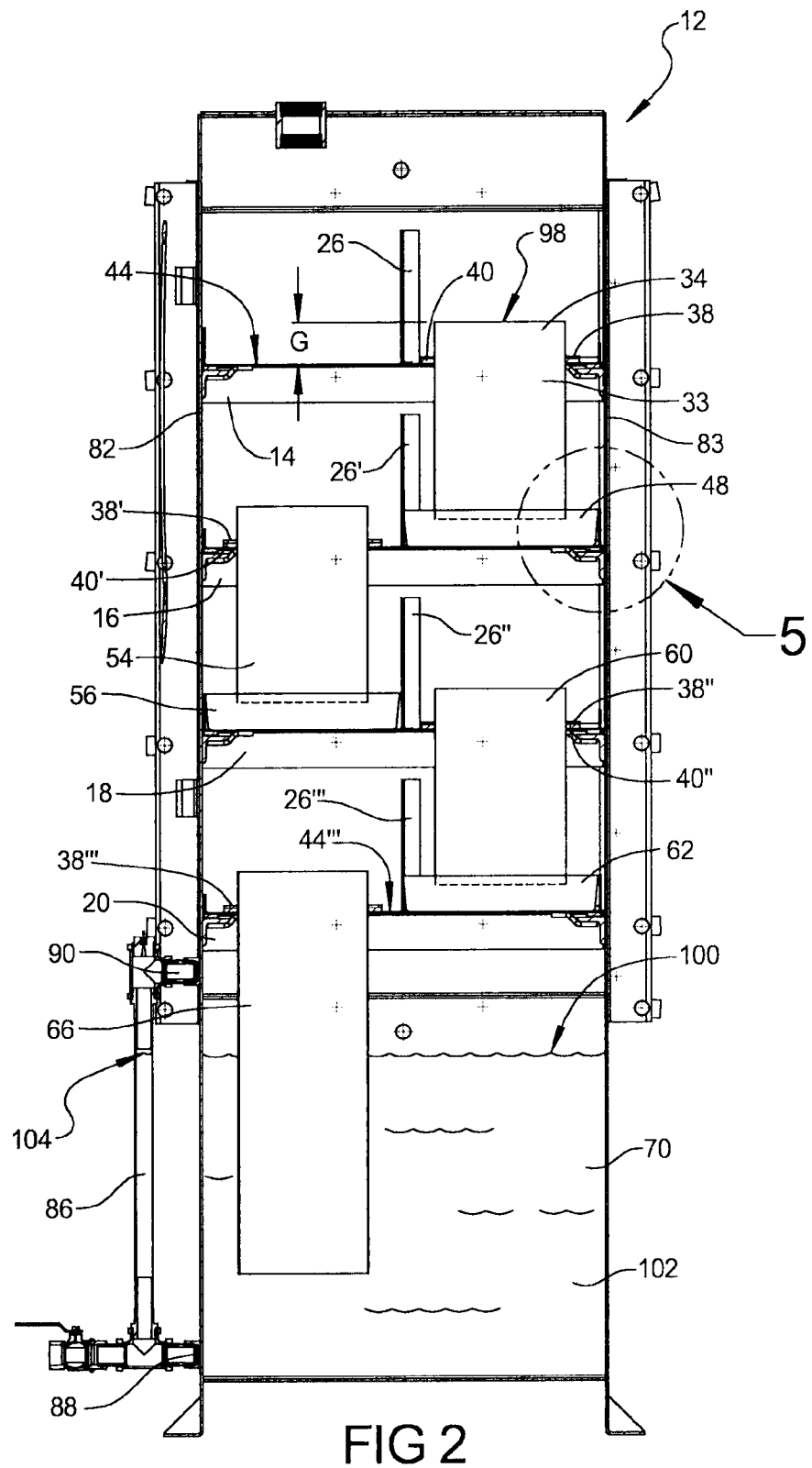
FIG. 2 is a cross sectional rear elevational view taken at section 2 of FIG. 1.

Referring to FIG. 2, the vertical stacked configuration of the various downcomer tube assemblies is evident. First downcomer tube 33 is aligned substantially vertical with respect to third downcomer tube 60. Similarly, second downcomer tube 54 is aligned substantially vertical with respect to fourth downcomer tube 66. The upper tube end of each of the downcomer tubes is positioned at a common height with respect to the sliding drawer from which the downcomer tube is suspended. For example, a tube upper edge 98 of upper downcomer tube end 34 of first downcomer tube 33 is located at a water column height "G" with respect to downcomer support drawer surface 44. This water column height "G" is repeated for each of the downcomer tubes. Water column height "G" is selected to maintain a known water height column for each of the sliding drawers such that a known and substantially constant volume of air is dispersed through each of the sliding drawers during its upward travel to reach the upper end of cabinet 12. A horizontal spacing of each of the downcomer tube assemblies, with respect to either cabinet first or second side walls 82, 83, is also maintained constant to help maintain a constant water flow rate on each of the sliding drawers.

Each of the second dividing walls 26, 26', 26", 26"' are vertically and, therefore, axially aligned with each other to also maintain a continuous spacing between the second dividing walls of each of the sliding drawers with respect to cabinet first and second side walls 82, 83. The greater length of fourth downcomer tube 66 is evident in FIG. 2 as it extends into chamber 70. A fluid level surface 100 of a clean water volume 102, temporarily received in chamber 70, is visually duplicated as an indicated fluid level surface 104 within fluid level indication standpipe 86. The system operator can therefore visually identify at all times where the fluid level surface 100 in chamber 70 is. This visual indication can be used to identify if additional or less flow of contaminated water can be received within cabinet 12. As previously noted, although each of the downcomer tubes of the various downcomer tube assemblies of the present disclosure are at least partially received within the individual seal pot pans, the downcomer tube assemblies are entirely supported by the sliding drawer above the seal pot pan.

Figure 3:
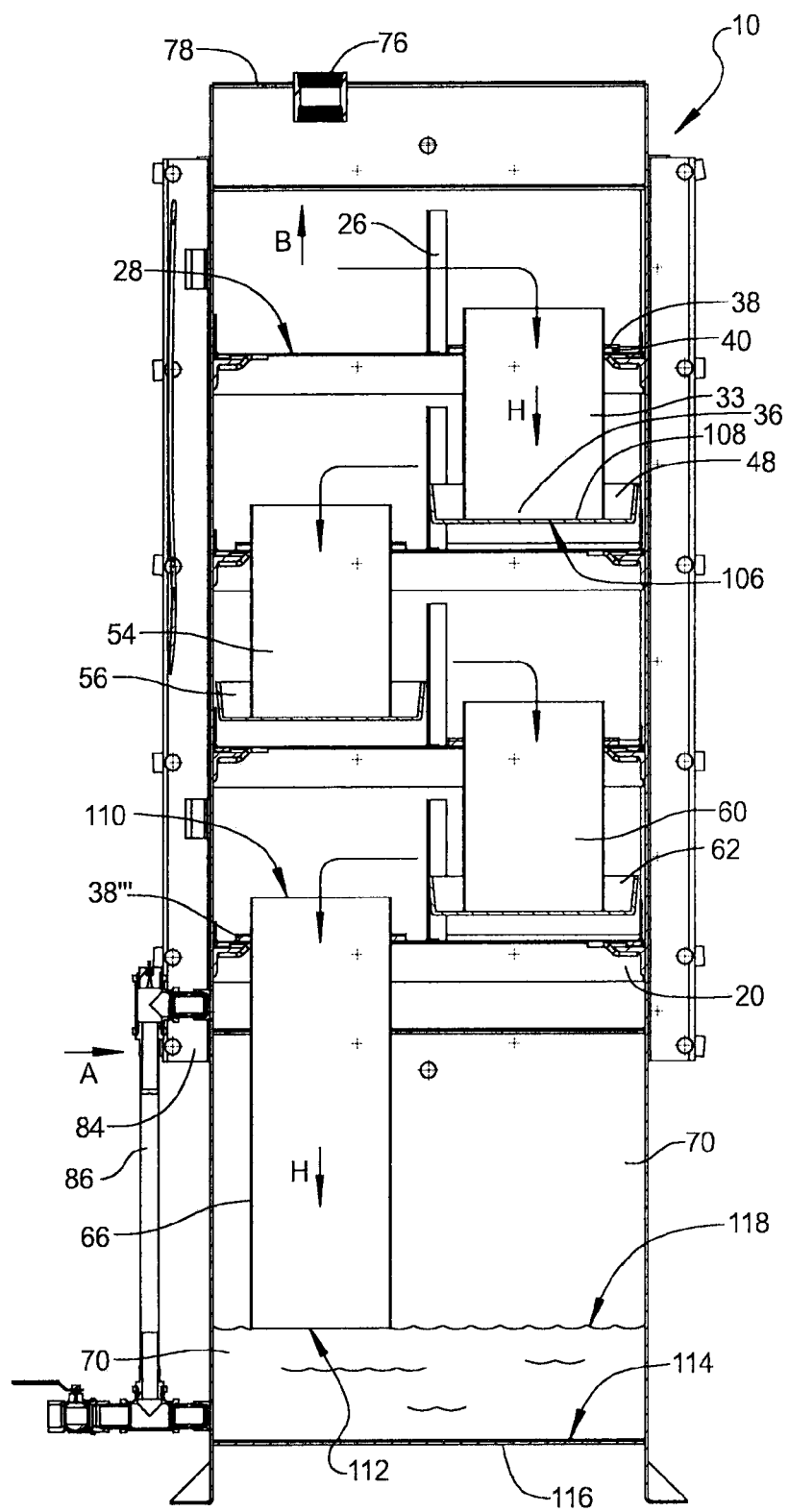
FIG. 3 is a cross sectional rear elevational view taken at section 3 of FIG. 1.

Referring to FIG. 3, the position of each of the first, second and third seal pot pans 48, 56, 62 is shown at the time of initial startup of VOC removal device 10. Initially, clean water is pumped into chamber 70 as necessary to establish a minimum fluid level 118 which will be described in greater detail below. In order to prevent the air entering through fresh air inlet port 84 from bypassing the perforated drawer portions 28 of the first, second, third and fourth sliding drawers 14, 16, 18, 20 by flowing upward through the first, second or third downcomer tubes 33, 54, 60, air entering through fresh air inlet port 84 in the inlet flow direction "A" lifts the initially empty first, second and third seal pot pans 48, 56, 62 such that a tube lower edge 106 of each lower downcomer tube end 36 contacts a pan bottom wall 108 of each of the first, second and third seal pot pans 48, 56, 62. In the lifted position, the first, second and third seal pot pans 48, 56, 62 therefore initially act as check valves preventing upward air flow through the downcomer tubes and forcing air flow through the perforated drawer portions 28.

A flow of fluid such as water contaminated with VOCs is then initiated which enters downwardly through contaminated fluid receiving port 76. As water fills each successive one of the first, second and third seal pot pans 48, 56, 62 a weight of the water forces the first, second and third seal pot pans 48, 56, 62 downward to the supported contact positions shown in FIG. 2. The water continuously present in each of the first, second and third seal pot pans 48, 56, 62 as shown in FIG. 2, which is above the tube lower edges 106 thereafter prevents air flow in the air/VOC flow direction "B" through any of the downcomer tubes. An exemplary flow path of the water contaminated with VOCs is indicated by the flow arrows traversing the individual downcomer tube assemblies in a generally downward flow path to reach chamber 70. Flow of water in each of the first, second, third, and fourth downcomer tubes 33, 54, 60, 66 is in a downward flow direction "H".

Similar to the first, second, and third downcomer tubes 33, 54, 60 fourth downcomer tube 66 is entirely supported by sealing flange 38"' from fourth sliding drawer 20. Water flows over a tube upper edge 110 of fourth downcomer tube 66 and in the downward flow direction "H" into chamber 70. A tube lower edge 112 is spaced vertically above an upward facing surface 114 of a cabinet bottom wall 116 of cabinet 12 such that the minimum fluid level 118 is maintained in chamber 70. Water level reaching the minimum fluid level 118 is visible in fluid level indication standpipe 86 to provide a visual indication to the system operator to shut off a discharge pump so that potentially VOC contaminated air within cabinet 12 is not drawn into the discharge pump from within cabinet 12, which could contain VOCs above a desired level.

Figure 4:
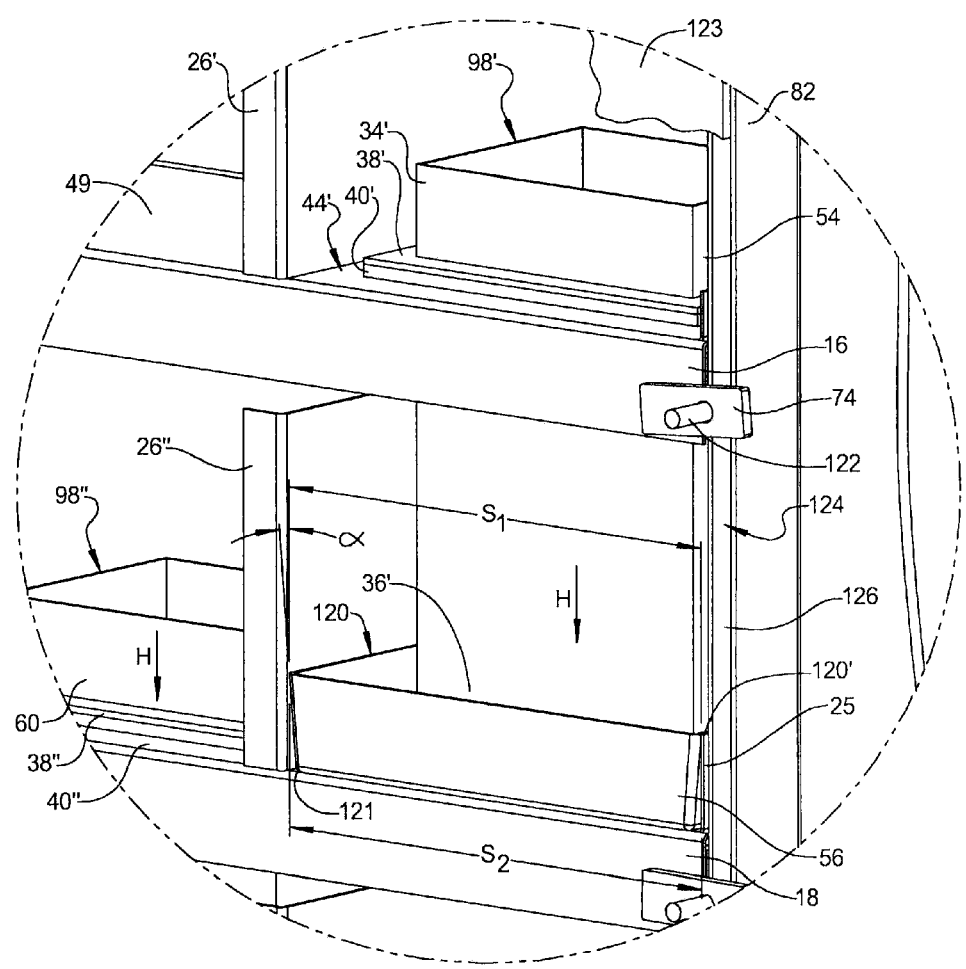
FIG. 4 is a front left perspective view of area 4 of FIG. 1.

Referring to FIG. 4, the exemplary arrangement of second downcomer tube 54 includes sealing flange 38' seated using downcomer gasket 40' to downcomer support drawer surface 44' of second sliding drawer 16. Water overflowing the tube upper edge 98' of second downcomer tube 54 flows downwardly in the downward flow direction "H" into second seal pot pan 56, which overflows above a seal pot pan upper edge 120 to follow a flow path around second dividing wall 26" to reach third downcomer tube 60 and overflow the tube upper edge 98" so that water flows downwardly in the downward flow direction "H" through third downcomer tube 60. Third downcomer tube 60 is entirely supported by sealing flange 38" in sealing contact with downcomer gasket 40" and supported by third sliding drawer 18.

According to additional embodiments, each seal pot pan such as seal pot pan 56 has upper edge 120 outwardly angled with respect to a lower base 121. An acute angle $\alpha$ defines this outward angle. The seal pot pans of the present disclosure can also have be in sliding contact at their support positions. For example, a spacing "$S_1$" between opposed upper edges 120, 120' of the seal pot pan 56 can be equal to a spacing "$S_2$" between perimeter wall portion 25 and the second dividing wall 26" such that the opposed upper edges 120, 120' of seal pot pan 56 is in sliding contact with the second dividing wall 26" and perimeter wall portion 25. This sliding clearance helps prevent water flow around the opposed upper edges 120, 120' of seal pot pan 56.

As further seen in FIG. 4, individual engagement members 74 are slidably received on threaded shafts 122 such that engagement members 74 can contact a door 123 (only a portion of which is shown for clarity) which is pressed by contact from engagement members 74 into sealing engagement with a sealing surface 124 of a cabinet/door seal member 126. Cabinet/door seal member 126 is located at a forward or front facing side of both cabinet first side wall 82 and cabinet second side wall 83 (not shown in this view).

Figure 5:
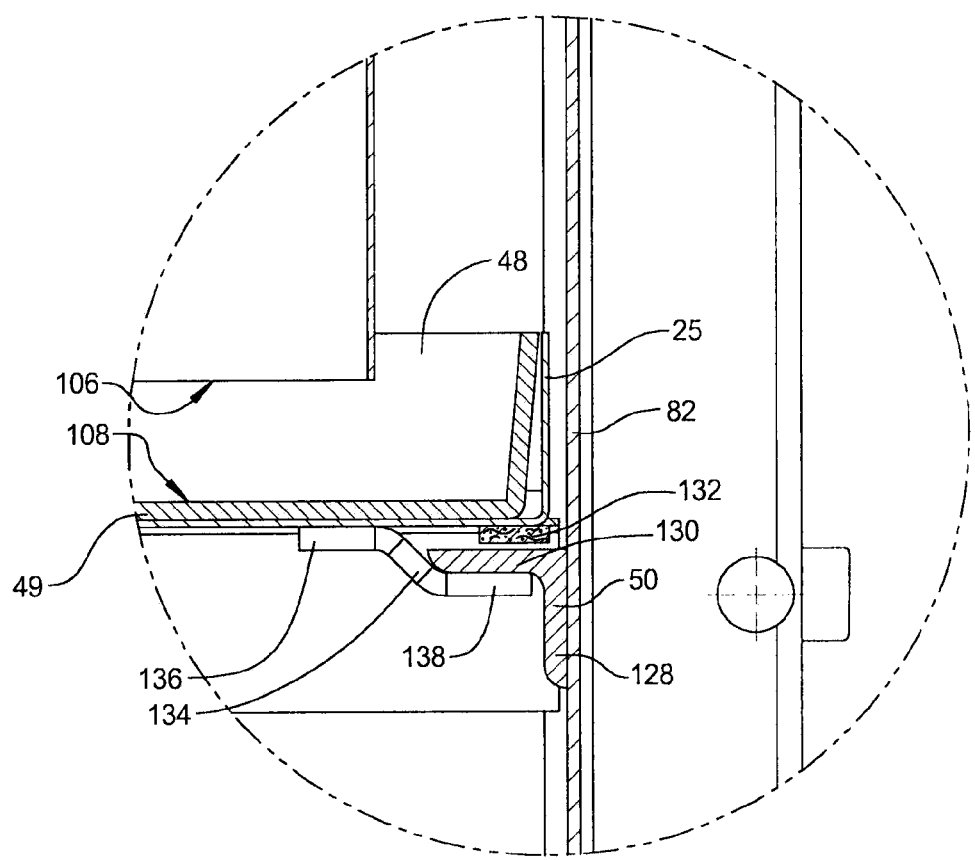
FIG. 5 is a front elevational view of area 5 of FIG. 2.

Referring to FIG. 5, all of the first, second, third, and fourth sliding drawers 14, 16, 18, 20 are in sliding engagement within cabinet 12, each using a similar slide configuration which includes drawer support members 50. Each drawer support member 50 includes a first leg 128 which, for example, is fixed to cabinet first side wall 82. A second leg 130 extends substantially perpendicular to cabinet first side wall 82 to slidably support a compressible drawer seal member 132 fixed to a bottom surface of the drawer, such as solid drawer portion 49, so that the weight of each sliding drawer is born by right and left side drawer seal members 132. In the fully inserted position, each sliding drawer is restrained from upward or downward motion by contact between a plurality of identical mount brackets 134 and a downward facing side of second leg 130 of drawer support member 50.

Each sliding drawer includes front and back left hand side and front and back right hand side mount brackets 134, which are oriented in a mirror image configuration. A bracket connecting leg 136 of each mount bracket 134 is fixed to the underside of the sliding drawer, such as to solid drawer portion 49, and a bracket support leg 138 is positioned in sliding contact with a downward facing side of the second leg 130 of drawer support member 50. Second leg 130 is thereby sandwiched between drawer seal member 132 and bracket support leg 138, which permits only a sliding motion of the sliding drawer into and out of the figure as viewed in FIG. 5. This configuration also partially supports the sliding drawer out to a partially extended position between drawer seal member 132 and second leg 130. This permits each sliding drawer to be positioned (as shown in FIG. 1) supporting the weight of the sliding drawer and its components, permitting the downcomer tube assembly to be removed from the sliding drawer or replaced after cleaning without completely removing the sliding drawer from cabinet 12. Each seal pot pan can similarly be removed after removal or lifting of the downcomer tube of the above sliding drawer, permitting the seal pot pan to also be slidably removed. Alternately, each sliding drawer can be completely removed for cleaning.

First, second, third, and fourth sliding drawers 14, 16, 18, 20 are discussed herein, however the present disclosure is not limited by the quantity of sliding drawers used. More or less than the four sliding drawers can be used in other embodiments of VOC removal devices within the scope of the present disclosure. The siding drawers can be arranged in different quantities in vertical configurations of varying height, and/or multiple side-by-side vertical columns of drawers can also be used in configurations that vary in either or both vertical height and horizontal width of the cabinet.

Referring to FIG. 6, a volatile organic compound (VOC) removal device 140 includes a cabinet 142 having a first vertical column 144 of sliding drawers and a second vertical column 146 of sliding drawers positioned on the right hand side of first vertical column 144. A vertical divider 148 is positioned between first and second vertical columns 144, 146. A first door 150 is closed against vertical divider 148 to seal the sliding drawers in first vertical column 144. A second door 152 is also closed against vertical divider 148 to seal the sliding drawers in second vertical column 146. A fluid pump 154 is connected to clean water discharge port 80 to remove clean water from VOC removal device 140. An air supply pipe 156 connected to fresh air inlet port 84 delivers air from an air fan 158. The components of VOC removal device 140 can all be mounted on a common skid 160 for ease of transport and installation. By further widening cabinet 142 and adding additional vertical dividers, it should be evident that a third, fourth, or more vertical columns of sliding drawers (not shown) can also be provided.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A volatile organic compound removal device, comprising:
    a cabinet sealed when a fluid is flowing in the cabinet, the cabinet having at least one drawer received in the cabinet; and
    at least one downcomer tube downwardly and slidably received in an aperture of the at least one drawer; and
    a sealing flange extending horizontally outward from a downcomer tube perimeter and extending beyond the aperture when the at least one downcomer tube is received in the aperture, the sealing flange facing an upward facing surface of the at least one drawer and supporting the at least one downcomer tube with respect to the at least one drawer using only a weight of the at least one downcomer tube applied through the sealing flange to the upward facing surface.

2. The volatile organic compound removal device of claim 1, wherein the at least one drawer includes first and second drawers, the first and second drawers each having the upward facing surface, the at least one downcomer tube including a first downcomer tube supported using the sealing flange on the upward facing surface of the first drawer.

3. The volatile organic compound removal device of claim 2, further including a seal pot pan supported on the upward facing surface of the second drawer and aligned directly below the first downcomer tube.

4. The volatile organic compound removal device of claim 3, wherein a lower tube end of the first downcomer tube is received in the seal pot pan such that water flowing downwardly through the first downcomer tube is entirely received within and then overflows the seat pot pan.

5. The volatile organic compound removal device of claim 1, further including a downcomer gasket positioned directly between the sealing flange and the upward facing surface of the at least one drawer.

6. The volatile organic compound removal device of claim 1, wherein the at least one drawer is slidably received in the cabinet and movable between an inserted and an extended position, the at least one downcomer tube being removable in an upward direction from the at least one drawer after moving the at least one drawer to the extended position.

7. The volatile organic compound removal device of claim 1, wherein the at least one downcomer tube has a non-circular geometric shape matching a non-circular geometric shape of the aperture to prevent axial rotation of the at least one downcomer tube when received in the aperture.

8. The volatile organic compound removal device of claim 1,
    wherein the at least one drawer includes first, second, third and fourth drawers; and
    wherein the at least one downcomer tube includes first, second, third and fourth downcomer tubes, each downwardly and slidably received in the aperture of one of the first, second, third or fourth drawer, and having its sealing flange extending horizontally outward from the downcomer tube perimeter and extending beyond the aperture.

9. The volatile organic compound removal device of claim 8, wherein the fourth downcomer tube is longer than the first, second and third downcomer tubes such that the fourth downcomer tube extends downwardly into a chamber created proximate to a cabinet bottom wall, a tube lower edge of the fourth downcomer tube defining a minimum fluid level of the chamber.

10. A volatile organic compound removal device, comprising:
    a cabinet having first and second drawers slidably received in the cabinet and individually movable between an inserted and an extended position; and
    a downcomer tube downwardly and slidably received in an aperture of the first drawer; and
    a sealing flange extending horizontally outward from a perimeter of the downcomer tube and extending beyond the aperture when the downcomer tube is received in the aperture, the sealing flange facing an upward facing surface of the first drawer and supporting the downcomer tube with respect to the first drawer using only a weight of the downcomer tube applied through the sealing flange to the upward facing surface; and a removable seal pot pan supported on an upward facing surface of the second drawer, aligned directly below and receiving a lower end of the downcomer tube, and movable upward when empty to contact a lower edge of the downcomer tube preventing airflow in an upward direction through the downcomer tube.

11. The volatile organic compound removal device of claim 10, further including a perforated drawer portion in each of the first and second drawers vertically aligned with each other.

12. The volatile organic compound removal device of claim 11, further including a first dividing wall separating a solid drawer portion from the perforated drawer portion of each of the first and second drawers, the first dividing wall having a height greater than a height of a drawer perimeter wall of each of the first and second drawers.

13. The volatile organic compound removal device of claim 12, further including a second dividing wall having a height greater than the height of first dividing wall and separating an upper end of the downcomer tube from the seal pot pan, the second dividing wall forcing a flow of water on the second drawer oppositely change direction of flow.

14. The volatile organic compound removal device of claim 13, wherein a spacing between a perimeter wall portion of the second drawer and the second dividing wall is less than a spacing between opposed upper edges of the seal pot pan such that insertion of the seal pot pan elastically deflects the opposed upper edges to frictionally engage the seal pot pan with the second dividing wall and the perimeter wall portion.

15. The volatile organic compound removal device of claim 10, wherein the seal pot pan has an upper edge outwardly angled with respect to a lower base.

16. A volatile organic compound removal device, comprising:
a cabinet having multiple drawers each slidably received in the cabinet and each individually movable between an inserted and an extended position;
individual downcomer tubes individually slidably received in an aperture of each of the drawers;
a sealing flange extending horizontally outward from a perimeter of each of the downcomer tubes and extending beyond the aperture when the downcomer tubes are received in the aperture of the one of the drawers, the sealing flange facing an upward facing surface of the one of the drawers and supporting the downcomer tube using only a weight of the downcomer tube applied through the sealing flange to the upward facing surface; and
multiple seal pot pans individually supported on an upward facing surface of individual ones of the multiple drawers, having a lower end of the downcomer tube from an upper one of the multiple drawers aligned with and received in the seal pot pan supported on a successive lower one of the drawers, each of the multiple seal pot pans freely movable upward when empty to contact a lower edge of the downcomer tube preventing airflow in an upward direction through the downcomer tube, and each movable downward from a weight of a liquid received from the downcomer tube to contact the upward facing surface of the individual ones of the multiple drawers.

17. The volatile organic compound removal device of claim 16, further including:
a drawer support member having a first leg fixed to a cabinet side wall and a second leg extending perpendicular to the cabinet side wall; and
a drawer seal member fixed to at least one of the multiple drawers, the drawer seal member slidable on the second leg of the drawer support member.

18. The volatile organic compound removal device of claim 17, further including a mount bracket having a bracket connecting leg fixed to the at least one of the multiple drawers and a bracket support leg positioned below and in sliding engagement with the second leg of the drawer support member.

19. The volatile organic compound removal device of claim 18, wherein the second leg of the drawer support member is sandwiched between the drawer seal member and the bracket support leg permitting sliding motion but preventing upward and downward movement of the at least one of the multiple drawers.

20. The volatile organic compound removal device of claim 16, further including a downcomer gasket positioned directly between the sealing flange and the upward facing surface.

* * * * *